US009630486B2

(12) United States Patent
Yamada et al.

(10) Patent No.: US 9,630,486 B2
(45) Date of Patent: Apr. 25, 2017

(54) VEHICLE (71) Applicant: HONDA MOTOR CO., LTD., Tokyo (JP)

(72) Inventors: Satoshi Yamada, Wako (JP); Manabu Yazaki, Wako (JP); Koichi Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/100,539

(22) PCT Filed: Dec. 2, 2014

(86) PCT No.: PCT/JP2014/081867
§ 371 (c)(1),
(2) Date: May 31, 2016

(87) PCT Pub. No.: WO2015/083699
PCT Pub. Date: Jun. 11, 2015

(65) Prior Publication Data
US 2016/0297291 A1 Oct. 13, 2016

(30) Foreign Application Priority Data

Dec. 2, 2013 (JP) .................................. 2013-249617

(51) Int. Cl.
*B60K 28/14* (2006.01)
*B62D 21/15* (2006.01)
(Continued)

(52) U.S. Cl.
CPC .................. *B60K 6/26* (2013.01); *B60K 1/02* (2013.01); *B60K 6/00* (2013.01); *B60K 6/40* (2013.01);
(Continued)

(58) Field of Classification Search
CPC ........ B60K 28/14; B60K 17/14; B60K 17/16; B62D 21/15; B62D 21/152; B62D 21/155;
(Continued)

(56) References Cited

U.S. PATENT DOCUMENTS 4,365,681 A * 12/1982 Singh ........................ B60K 1/04
105/51
4,596,299 A *  6/1986 Krude ..................... B60G 3/225
180/348

(Continued)

FOREIGN PATENT DOCUMENTS

JP          6-278478 A    10/1994
JP       2009-061915 A     3/2009
(Continued)

OTHER PUBLICATIONS

International Search Report dated Feb. 24, 2015, issued in International Application No. PCT/JP2014/081867, with English translation (3 page).

Primary Examiner — Barry Gooden, Jr.
(74) Attorney, Agent, or Firm — Westerman, Hattori, Daniels & Adrian, LLP (57) ABSTRACT A vehicle including a mounted object, which is supported by a framework member of the vehicle with a supporting member and which is disposed offset to one side of the vehicle with respect to a center of the vehicle in a front-rear direction, wherein the mounted object includes an extending portion that extends from the mounted object while inclined to a vertical direction or that extends from the mounted object in a horizontal direction, and that is formed such that, when an external force of a predetermined value or larger is exerted on the mounted object from the one side to displace the mounted object to the other side by a predetermined (Continued)

amount or larger, the extending portion abuts on a surface of the right-left framework member, the surface facing upward in the vertical direction.

10 Claims, 9 Drawing Sheets

(51) Int. Cl.
*B60K 6/26* (2007.10)
*B60K 1/02* (2006.01)
*B60K 6/00* (2006.01)
*B60K 6/40* (2007.10)
*B60K 6/52* (2007.10)
*B60K 1/00* (2006.01)

(52) U.S. Cl.
CPC ............... *B60K 6/52* (2013.01); *B60K 28/14* (2013.01); *B62D 21/15* (2013.01); *B60K 2001/001* (2013.01); *B60K 2006/266* (2013.01); *B60Y 2200/92* (2013.01); *B60Y 2400/82* (2013.01); *Y10S 903/906* (2013.01); *Y10S 903/951* (2013.01)

(58) Field of Classification Search
CPC ....... B60G 9/02; B60B 35/004; B60B 35/005; B60B 35/006
See application file for complete search history.

(56) References Cited

U.S. PATENT DOCUMENTS

| | | | | |
|---|---|---|---|---|
| 4,652,009 A * | 3/1987 | Ando | ................. | B60G 3/24 267/248 |
| 4,836,321 A * | 6/1989 | Baumann | ................. | B60R 19/00 180/232 |
| 4,856,751 A * | 8/1989 | Ohba | ................. | B60K 5/1291 180/291 |
| 5,161,638 A * | 11/1992 | Hirano | ................. | B60K 17/16 180/312 |
| 5,476,151 A * | 12/1995 | Tsuchida | ................. | B60K 1/00 180/274 |
| 5,555,950 A * | 9/1996 | Harada | ................. | H01M 2/1083 180/232 |
| 5,915,494 A * | 6/1999 | Matsumura | ................. | B60K 5/04 180/232 |
| 5,992,555 A * | 11/1999 | Sakamoto | ................. | B60K 5/1216 180/232 |
| 6,298,936 B1 * | 10/2001 | Yoshida | ................. | B60K 5/1216 180/232 |
| 7,717,207 B2 * | 5/2010 | Watanabe | ................. | B60K 1/04 180/274 |
| 8,037,960 B2 * | 10/2011 | Kiya | ................. | B60K 1/04 180/68.5 |
| 8,051,934 B2 * | 11/2011 | Kiya | ................. | B60K 1/04 180/274 |
| 8,522,909 B2 * | 9/2013 | Niina | ................. | B60K 1/00 180/291 |
| 8,540,282 B2 * | 9/2013 | Yoda | ................. | B60K 1/04 180/232 |
| 8,739,910 B2 * | 6/2014 | Katayama | ................. | B62D 21/152 180/311 |
| 9,283,838 B2 * | 3/2016 | Ohashi | ................. | B60K 1/04 |
| 2003/0047932 A1 * | 3/2003 | Kawazu | ................. | B60K 15/07 280/830 |
| 2004/0195862 A1 * | 10/2004 | Saeki | ................. | B62D 21/152 296/187.09 |
| 2005/0161935 A1 * | 7/2005 | Ono | ................. | B60K 15/07 280/834 |
| 2007/0051549 A1 * | 3/2007 | Fukuda | ................. | B60K 1/00 180/232 |
| 2007/0215399 A1 * | 9/2007 | Watanabe | ................. | B60K 1/04 180/68.5 |
| 2008/0197672 A1 * | 8/2008 | Yamaguchi | ................. | B62D 21/155 296/187.09 |
| 2009/0195030 A1 * | 8/2009 | Yamaguchi | ................. | B62D 21/152 296/193.08 |
| 2009/0226806 A1 * | 9/2009 | Kiya | ................. | B60K 1/04 429/186 |
| 2010/0032542 A1 * | 2/2010 | Heitkamp | ................. | B60K 17/24 248/548 |
| 2010/0032983 A1 * | 2/2010 | Kusaka | ................. | B60G 99/004 296/187.03 |
| 2010/0060033 A1 * | 3/2010 | Miura | ................. | B62D 33/067 296/190.05 |
| 2010/0264637 A1 * | 10/2010 | Kosaka | ................. | B62D 25/2018 280/784 |
| 2011/0068606 A1 * | 3/2011 | Klimek | ................. | B60K 1/04 296/187.08 |
| 2011/0132672 A1 | 6/2011 | Niina | | |
| 2012/0015257 A1 * | 1/2012 | Arisawa | ................. | B60K 1/04 429/400 |
| 2012/0015772 A1 * | 1/2012 | Kira | ................. | B60K 6/442 475/149 |
| 2012/0313361 A1 * | 12/2012 | Saneyoshi | ................. | B60K 17/16 280/834 |
| 2013/0008735 A1 * | 1/2013 | Hiramatsu | ................. | B62D 21/155 180/291 |
| 2013/0033048 A1 * | 2/2013 | Oyama | ................. | B60H 1/2209 293/155 |
| 2013/0119704 A1 * | 5/2013 | Amano | ................. | B60K 1/00 296/187.1 |
| 2013/0119706 A1 * | 5/2013 | Katayama | ................. | B62D 21/152 296/187.09 |
| 2013/0137303 A1 * | 5/2013 | Yazaki | ................. | H02K 5/225 439/625 |
| 2013/0249243 A1 * | 9/2013 | Lee | ................. | B62D 21/152 296/187.03 |
| 2014/0361560 A1 * | 12/2014 | Sakakibara | ................. | B62D 21/152 293/133 |
| 2016/0207574 A1 * | 7/2016 | Tanaka | ................. | B62D 21/155 |

FOREIGN PATENT DOCUMENTS

JP 2011-116251 A 6/2011
JP 2013-067327 A 4/2013

* cited by examiner

VEHICLE

TECHNICAL FIELD

The present invention relates to a vehicle including a mourned object that is supported by a framework member via a supporting member.

BACKGROUND ART

Electric vehicles such as electric cars and hybrid cars include a motor for driving a vehicle as a mounted object. However, since the motors for driving a vehicle or the like are rather heavy objects, once they are moved into an occupant space at the time of collision, a dynamic adverse affect may be caused.

In order to solve this problem, technologies have been conventionally proposed for controlling the displacement of the objects that are mounted on vehicles at the time of collision. For example, in the vehicle described in patent literature 1, a vulnerable portion is provided, on the side of a battery unit of a power unit, to a bracket for supporting the battery unit at a vehicle body, while the other vulnerable portion is provided to a bracket for supporting the opposite side of the power unit at the vehicle body. In addition, the vulnerable portion on the battery unit side is configured to be broken with smaller impact load that is input from one end portion of the vehicle body when the vehicle collides on one end side of the vehicle in the front-rear direction than the impact load that is input from the other end portion of the vehicle body when the vehicle collides on the other end side of the vehicle in the front-rear direction. The other vulnerable portion on the opposite side to battery unit is configured to be broken at the stage earlier than the stage where the bracket vulnerable portion on the battery unit side is broken when the vehicle collides on the one end side of the vehicle in the front-rear direction, and broken with larger impact load than the impact load at which the bracket vulnerable portion on the battery unit side is broken when the vehicle collides on the other end side of the vehicle in the front-rear direction. This configuration detaches the power unit from the vehicle body with being tilted position. It is described that this tilted position allows the power unit to be displaced while running on the top surface of the battery unit even if the power unit reaches the battery unit, which prevents the power unit from bumping into the battery unit head-on.

PRIOR ART LITERATURE

Patent Literature

Patent Literature 1: JP-A-2009-61915

SUMMARY OF THE INVENTION

Problem that the Invention is to Solve

However, it is difficult to break the bracket at the time of collision to control the displacement of the mounted object. To be specific, to predict the behavior of the mounted object is not easy after the bracket is broken, so that it is preferable that the mounted object should not fall off without breaking a supporting member for the mounted object as much as possible.

The present invention is to provide a vehicle capable of inhibiting an mounted object from being displaced at the time of collision, and suppressing the mounted object from falling off.

Means for Solving the Problem

The present invention provides the following aspects.

According to a first aspect, there is provided a vehicle (e.g., a vehicle 3) including a mounted object (e.g., a rear wheel driving system 1), which is supported by a framework member (e.g., a sub-frame 13) of the vehicle with a supporting member (e.g., brackets 81A and 81B, and supporting portions 82A and 82B), wherein
  the mounted object includes an extending portion (e.g., extending portions 93A and 93B) that extends from the mounted object while inclined to a vertical direction or that extends from the mounted object in a horizontal direction, and is arranged to abut on a surface (e.g., a top surface 13f) of the framework member when an external force of a predetermined value or larger is exerted on the mounted object to displace the mounted object by a predetermined amount or larger, the surface facing upward in the vertical direction.

In addition to the configuration in the first aspect, a second aspect is characterized in that:
  the mounted object is disposed offset to one side (e.g., the rear side) of the vehicle with respect to a center of the vehicle in a front-rear direction;
  the framework member includes a pair of front-rear framework members (e.g., sub-side frames 13A and 13B) that extends in the front-rear direction of the vehicle, and a right-left framework member (e.g., a front cross frame 13C) that extends in a right-left direction of the vehicle and that is fixed to the pair of front-rear framework members;
  the mounted object is disposed on the one side with respect to the right-left framework member, and
  the extending portion extends from the mounted object to the other side (e.g., the front side) in the front-rear direction, and is formed such that, when an external force of a predetermined value or larger is exerted on the mounted object from the one side to displace the mounted object to the other side by a predetermined amount or larger, the extending portion abuts on a surface of the right-left framework member, the surface facing upward in the vertical direction.

In addition to the configuration in the second aspect, a third aspect is characterized in that
  the vehicle further includes another right-left framework member (e.g., a rear cross frame 13D) that is disposed in parallel with the right-left framework member to sandwich the mounted object therebetween, and that is fixed to the pair of front-rear framework members.

In addition to the configuration in the third aspect, a fourth aspect is characterized in that:
  the supporting member includes a first supporting member (e.g., supporting portions 82A and 82B) and a second supporting member (e.g., brackets 81A and 81B);
  the mounted object includes fixing portions (e.g., front fixing portions 91A and 91B, and rear fixing portions 92A and 92B) that are fixed to the first supporting member and the second supporting member; and
  a first fixing portion (e.g., rear fixing portions 92A and 92B) of the fixing portions, the first fixing portion being disposed relatively closer to the one side, is disposed at a higher position in the vertical direction than a second fixing portion (e.g., front fixing portions 91A and 91B) of the fixing portions, the second fixing portion being disposed closer to the other side.

In addition to the configuration in any one of the first to fourth aspects, a fifth aspect is characterized in that
the extending portion includes two extending portions that are disposed on a right side and a left side with respect to a center of the mounted object in a right-left direction.

In addition to the configuration in the fifth aspect, a sixth aspect is characterized in that
the two extending portions are disposed in approximately symmetrical positions with respect to the center in the right-left direction.

In addition to the configuration in any one of the second to fourth aspects, a seventh aspect is characterized, in that
the right-left framework member includes another extending portion (e.g., a joint flange 13e) that extends from the right-left framework member toward the mounted object.

In addition to the configuration in the first aspect, an eighth aspect is characterized in that:
the framework member includes a pair of front-rear framework members (e.g., sub-side frames 13A and 13B) that extends in the front-rear direction of the vehicle;
the extending portion includes a first extending portion (e.g., an extending portion 93B) that extends from the mounted object to a left side of the vehicle in the right-left direction, and a second extending portion (e.g., an extending portion 93A) that extends to a right side of the vehicle in the right-left direction; and
the first extending portion and the second extending portion are formed such that, when an external force of a predetermined value or larger is exerted on the mounted object to displace the mounted object downward in the vertical direction by a predetermined amount or larger, the first extending portion and the second extending portion abut on surfaces of the pair of front-rear framework members, the surfaces facing upward in the vertical direction.

In addition to the configuration in any one of the first to eighth aspects, a ninth aspect is characterized in that
the extending portion extends in an approximately horizontal direction.

In addition to the configuration in any one of the first to ninth aspects, a tenth aspect is characterized in that
the extending portion includes a protruding portion (e.g., a protruding portion 94) that extends further from a distal end of the extending portion.

In addition to the configuration in any one of the first to tenth aspects, an eleventh aspect is characterized in that
the mounted object is a motor (e.g., first and second motors 2A and 2B) that drives a wheel (e.g., rear wheel Wr) of the vehicle.

Advantage of the Invention

According to the first aspect, since the extending portion is arranged to abut on the surface of the framework member that faces upward when an external force of a predetermined value or larger is input to the vehicle at the time of collision or the like, the mounted object can be inhibited from being displaced, which can suppress the mounted object from falling off the framework member.

According to the second aspect, since when the mounted object is disposed offset to one side, the extending portion extending on the other side is provided because an external force input from the one side causes larger displacement, the mounted object can be made to reliably abut on the right-left framework member.

According to the third aspect, the another right-left framework member can reduce the impact from the other side. Further, since the framework members surround the four surfaces of front, rear, right, and left of the mounted object, the rigidity of the periphery of the mounted object can be improved.

According to the fourth aspect, a large external force could act on if an external force is exerted from the one side of the motor when the mounted object is disposed offset to the one side. Since the fixing portions of the supporting member have a positional relation such that the first fixing portion that is disposed relatively closer to the one side is disposed at a higher position in the vertical direction than the second fixing portion that is disposed closer to the other side, a moment which raises the one side of the mounted object upward and lowers the other side downward is generated when an external force is input from the one side, and then the displacement direction of the motor can be made to be a direction away from an occupant space, which can improve the safe performance at the time of collision.

According to the fifth aspect, since the extending portions are provided on the right side and the left side, the extending portions make the mounted object less likely to lose its posture (balance) after abutting.

According to the sixth aspect, since the extending portions are disposed at approximately mirror-symmetrical positions, the extending portions make the mounted object much less likely to lose its posture after abutting.

According to the seventh aspect, since the another extending portion extends also from the right-left framework member, the extending portion of the mounted object is made to easily abut on the right-left framework member.

According to the eighth aspect, the mounted object can be made to reliably abut on the front-rear framework members irrespective of the amount of displacement in the front-rear direction. In addition, since the two front-rear framework members are provided on the right side and the left side, the front-rear framework members make the mounted object less likely to lose its posture after abutting.

According to the ninth aspect, the mounted object can be made to less likely to fall off after abutting.

According to the tenth aspect, the extending portion can be easily caught by the framework member, thus preventing the mounted object from falling off.

According to the eleventh aspect, the motor, which is heavy, can be prevented from falling off.

MODE FOR CARRYING OUT THE INVENTION

Hereinafter, a vehicle according to an embodiment will be described by taking a hybrid vehicle as an example.

Figure 1:
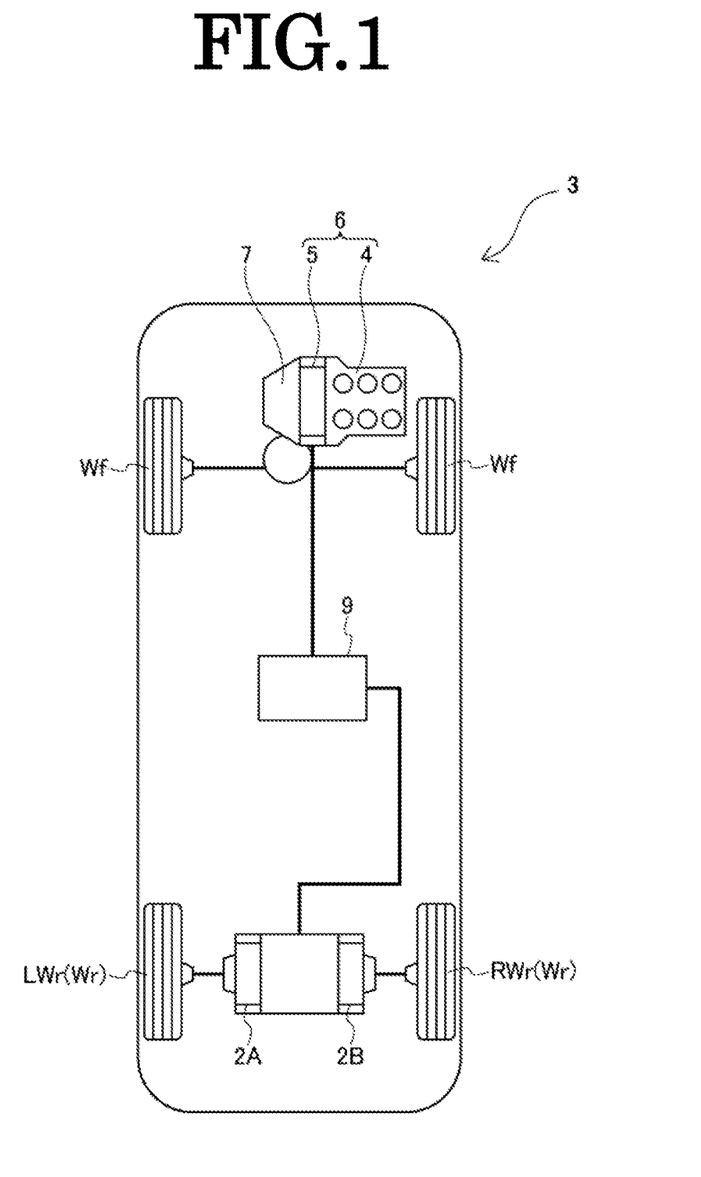
FIG. 1 is a block diagram showing a schematic configuration of a hybrid vehicle according to an aspect of the present invention.

A vehicle 3 shown in FIG. 1 is a hybrid vehicle including a driving system (hereinafter, referred to as a front wheel driving system) 6 that is disposed in a vehicle front portion and includes an internal combustion engine 4 and a motor 5 that are connected in series. While the power of the front wheel driving system 6 is transmitted to front wheels Wf via a transmission 7, the power of a driving system (hereinafter, referred to as a rear wheel driving system) 1 that is provided separately from the front wheel driving system 6 and disposed lower than a floor panel (not illustrated) in a vehicle rear portion is transmitted to rear wheels Wr (RWr and LWr). The rear wheel driving system 1 includes first and second motors 2A and 2B, and the power of the first motor 2A is transmitted to the left rear wheel LWr while the power of the second motor 2B is transmitted to the right rear wheel RWr. The motor 5 of the front wheel driving system 6 and the first and second motors 2A and 2B of the rear wheel driving system 1 are connected to a battery 9, which allows electric power supply from the battery 9 and energy regeneration to the battery 9.

Figure 2:
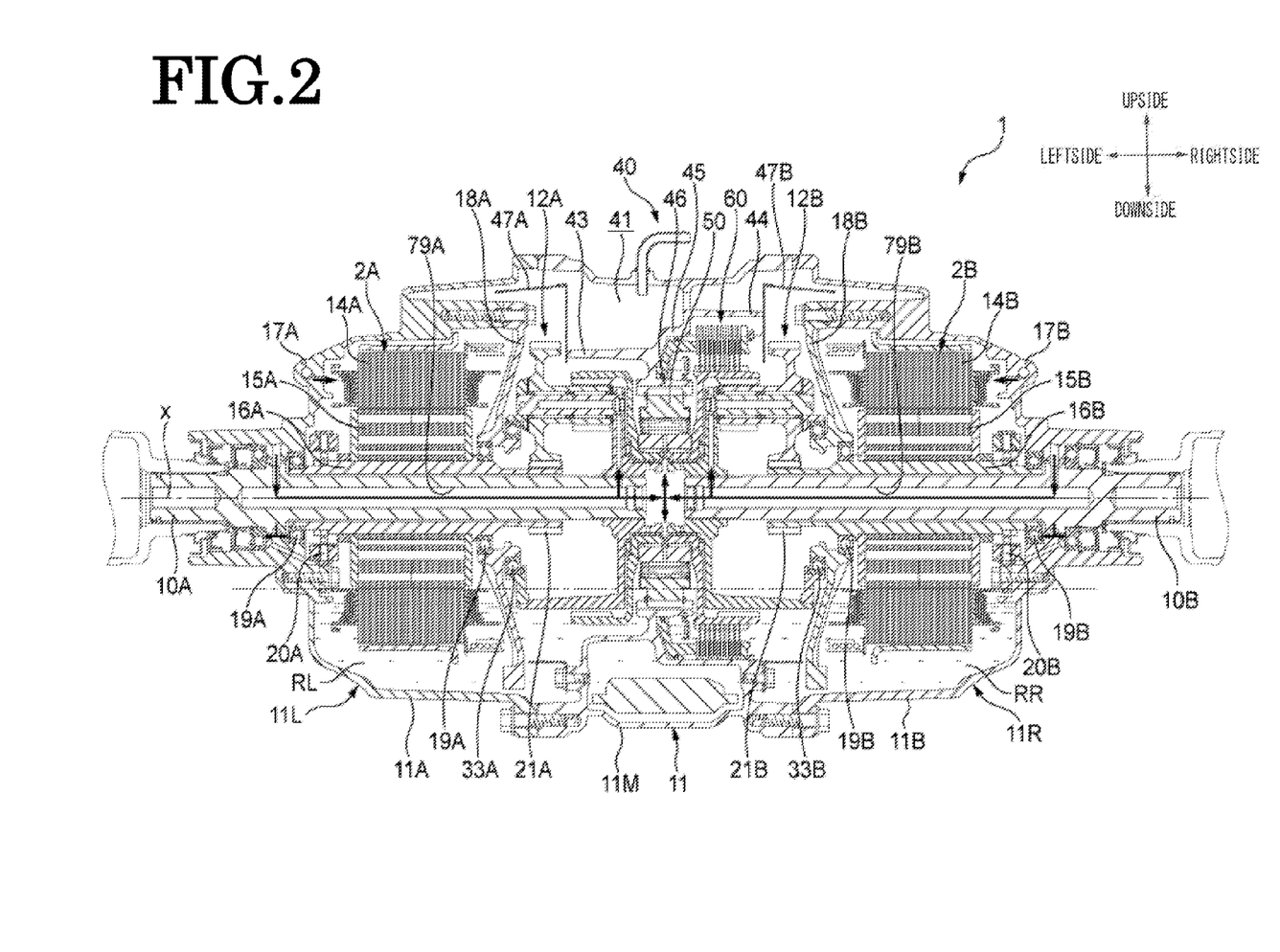
FIG. 2 is a vertical sectional view of a rear wheel driving system including a motor.
Figure 3:
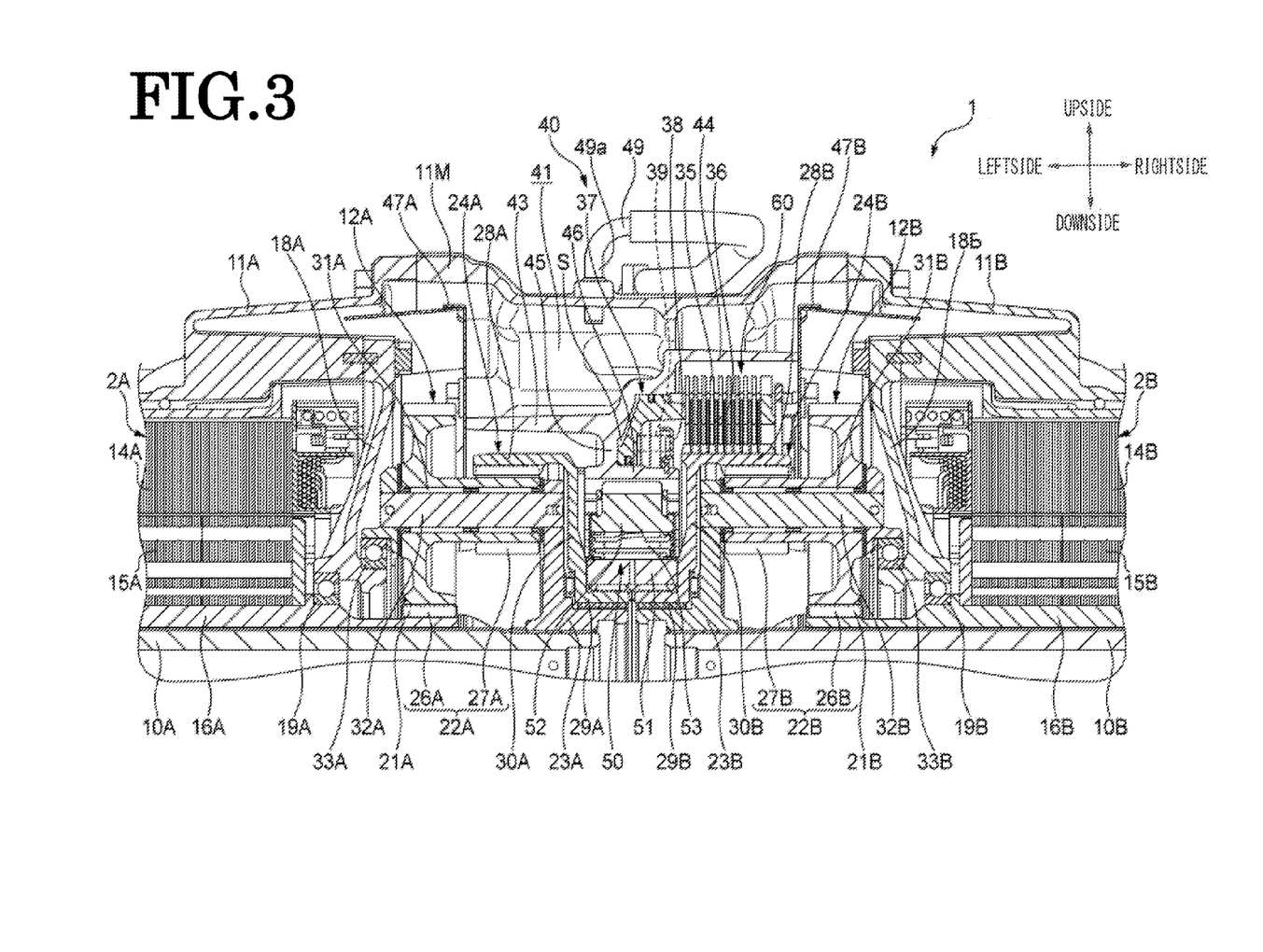
FIG. 3 is an enlarged sectional view of the rear wheel driving system shown in FIG. 2 showing the upper portion thereof.

FIG. 2 is a vertical longitudinal sectional view of the whole of the rear wheel driving system 1, and FIG. 3 is an enlarged sectional view of the upper portion of FIG. 2. A case 11 that is a housing of the rear wheel driving system 1 includes a central case 11M disposed at an approximately central portion in a vehicle width direction (hereinafter, also referred to as a right and left direction of the vehicle), and a left side case 11A and a right side case 11B disposed on the right-left sides of the central case 11M so as to sandwich the central case 11M therebetween. The case 11 has an approximately cylindrical shape as a whole. Inside of the case 11, axle shafts 10A and 10B for the rear wheels Wr, the first and second motors 2A and 2B for driving the axle shafts, and first and second planetary gear type speed reducers 12A and 12B that define first and second speed changers for decelerating the driving rotations of the first and second motors 2A and 2B are disposed on a same rotating axis x. The axle shaft 10A, the first motor 2A, and the first planetary gear type speed reducer 12A control driving of the left rear wheel LWr, and the axle shaft 10B, the second motor 2B, and the second planetary gear type speed reducer 12B control driving of the right rear wheel RWr. The axle shaft 10A, the first motor 2A, and the first planetary gear type speed reducer 12A are disposed at bilaterally symmetrical positions with the axle shaft 10B, the second motor 2B, and the second planetary gear type speed reducer 12B in the vehicle width direction inside the case 11.

Partition walls 18A and 18B extending in a radial inner direction are provided respectively to the side cases 11A and 11B on the sides closer to the central case 11M. The first and second motors 2A and 2B are disposed respectively between the side cases 11A and 11B and the partition walls 18A and 18B. In addition, the first and second planetary gear type speed reducers 12A and 12B are disposed in the spaces surrounded by the central case 11M and the partition walls 18A and 18B. As shown in FIG. 2, in the present embodiment, the left side case 11A and the central case 11M define a first case 11L to house the first motor 2A and the first planetary gear type speed reducer 12A while the right side case 11B and the central case 11M define a second case 11R to house the second motor 2B and the second planetary gear type speed reducer 12B. The first case 11L includes a left reservoir portion RL to reserve oil that defines a liquid medium used to lubricate and/or cool at least one of the first motor 2A and a power transmission path. The second case 11R includes a right reservoir portion RR to reserve oil used to lubricate and/or cool at least one of the second motor 2B and the power transmission path.

A breather device 40 that establishes a communication between the interior and the exterior of the case 11 is provided to the rear wheel driving system 1, and configured to release the inside air to the exterior via a breather chamber 41 in order to prevent the inside air from being extremely heated to high temperatures or being extremely pressurized to high pressures. The breather chamber 41 is disposed above the case 11 in the vertical direction, and made up of the space defined by an external wall of the central case 11M, a first cylindrical wall 43 extending approximately horizontally in the central case 11M closer to the left side case 11A, a second cylindrical wall 44 extending approximately horizontally in the central case 11M closer to the right side case 11B, a right-left dividing wall 45 that connects inner end portions of the first and second cylindrical walls 43 and 44, a baffle plate 47A mounted so as to abut on a distal end portion of the first cylindrical wall 43 that is closer to the left side case 11A, and a baffle plate 47B mounted so as to abut on a distal end portion of the second cylindrical wall 44 that is closer to the right side case 11B.

In the first and second cylindrical walls 43 and 44, and the right-left dividing wall 45 that define a lower surface of the breather chamber 41, the first cylindrical wall 43 is disposed more inside in the radial direction than the second cylindrical wall 44, and the right-left separating wall 45 extends from an inner end portion of the second cylindrical wall 44 to an inner end portion of the first cylindrical wall 43 while reduced in diameter and bending, and further extends in the radial inner direction to reach a third cylindrical wall 46 that extends approximately horizontally. The third cylindrical wall 46 is disposed more inside than both of the outer end portions of the first cylindrical wall 43 and the second cylindrical wall 44 in the approximately center between the first cylindrical wall 43 and the second cylindrical wall 44.

The baffle plates 47A and 47B are fixed to the central case 11M so as to divide a space defined between the first cylindrical wall 43 and the external wall of the central case 11M or a space defined between the second cylindrical wall 44 and the external wall of the central case 11M respectively from the first planetary gear type speed reducer 12A or the second planetary gear type speed reducer 12B.

In addition, in the central case 11M, an external communication passageway 49 that establishes a communication between the breather chamber 41 and the exterior of the case 11 is connected to a top surface of the breather chamber 41 in the vertical direction. An end portion 49a provided to the external communication passageway 49 on the breather chamber side is oriented downward in the vertical direction. Consequently, oil is prevented from being discharged to the exterior through the external communication passageway 49.

In the first and second motors 2A and 2B, stators 14A and 14B are fixed respectively to the side cases 11A and 11B, and rotors 15A and 15B having an annular shape are disposed respectively on inner circumference sides of the stators 14A and 14B so as to be relatively rotatable to the stators 14A and 14B. Cylindrical shafts 16A and 16B that surround the outer circumferences of the axle shafts 10A and 10B are connected respectively to inner circumferential portions of the rotors 15A and 15B. The cylindrical shafts 16A and 16B are supported respectively by end walls 17A and 17B of the side cases 11A and 11B and the partition walls 18A and 18B via bearings 19A and 19B so as to be relatively rotatable to the axle shafts 10A and 10B coaxially. Resolvers 20A and 20B arranged to feed back information on rotational positions of the rotors 15A and 15B to a controller (not illustrated) for controlling the first and second motors 2A and 2B are provided to the end walls 17A and 17B on the outer circumferences of the cylindrical shafts 16A and 16B at the end portions.

The first and second planetary gear type speed reducers 12A and 12B include sun gears 21A and 21B, ring gears 24A and 24B disposed on outer circumferential sides of the sun gears 21A and 21B, a plurality of planetary gears 22A and 22B arranged to mesh with the sun gears 21A and 21B and the ring gears 24A and 24B, and planetary carriers 23A and 23B arranged to support the planetary gears 22A and 22B. Driving forces of the first and second motors 2A and 2B are input from the sun gears 21A and 21B, and the decelerated driving forces are output to the axle shafts 10A and 10B via the planetary carriers 23A and 23B.

The sun gear 21A and the cylindrical shaft 16A are of a monolithic construction while the sun gear 21B and the cylindrical shaft 16B are of a monolithic construction. The planetary gears 22A and 22B define double pinions including first pinions 26A and 26B larger in diameter and arranged to mesh directly with the sun gears 21A and 21B, and second pinions 27A and 27B smaller in diameter than the first pinions 26A and 26B. The first pinion 26A and the second pinion 27A are of a monolithic construction while being coaxial and offset in the axial direction, and the first pinion 26B and the second pinion 27B are of a monolithic construction while being coaxial and offset in the axial direction. The planetary gears 22A and 22B are supported by pinion shafts 32A and 32B of the planetary carriers 23A and 23B via needle bearings 31A and 31B. The planetary carriers 23A and 23B have axial inner end portions that extend in the radial inner direction, and are spline fitted to the axle shafts 10A and 10B to be supported so as to be integrally rotatable therewith while supported by the partition walls 18A and 18B via bearings 33A and 33B.

The ring gears 24A and 24B include gear portions 28A and 28B that have inner circumferential surfaces arranged to mesh with the second pinion gears 27A and 27B smaller in diameter, small diameter portions 29A and 29B smaller in diameter than the gear portions 28A and 28B and disposed facing each other in the middle position of the case 11, and connecting portions 30A and 30B arranged to connect axially inner end portions of the gear portions 28A and 28B and axially outer end portions of the small diameter portions 29A and 29B together in the radial direction.

The gear portions 28A and 28B face each other in the axial direction while sandwiching the third cylindrical wall 46 disposed at an end portion of the right-left dividing wall 45 of the central case 11M in the radial inner direction. The small diameter portions 29A and 29B have outer circumferential surfaces arranged to be spline fitted to inner races 51 of a one-way clutch 50 to be described later. The ring gears 24A and 24B are connected to each other so as to integrally rotate with the inner races 51 of the one-way clutch 50.

A hydraulic brake 60 that constitutes a brake unit for the ring gear 24B is disposed on the side of the second planetary gear type speed reducer 12B between the second cylindrical wall 44 of the central case 11M that constitutes the case 11 and the gear portion 28B of the ring gear 24B so as to overlap the first pinion 26B in the radial direction and to overlap the second pinion 27B in the axial direction. In the hydraulic brake 60, a plurality of fixed plates 35 that are spline fitted to an inner circumferential surface of the second cylindrical wall 44, and a plurality of rotational plates 36 that are spline fitted to an outer circumferential surface of the gear portion 28B of the ring gear 24B are disposed alternately in the axial direction, and these plates 35 and 36 are operated to be engaged with and disengaged from each other by an piston 37 having an annular shape. The piston 37 is housed in a cylinder chamber having an annular shape that is defined between the right-left dividing wall 45 and the third cylindrical wall 46 in the central case 11M so as to reciprocate freely therein. Further, the piston 37 is urged in a direction in which the fixed plates 35 and the rotational plates 36 are disengaged from each other in a normal state by an elastic member 39 supported by a bearing seat 38 provided on an outer circumferential surface of the third cylindrical wall 46.

To describe this in greater detail, the space defined between the right-left dividing wall 45 and the piston 37 defines a working chamber S into which oil is directly introduced. When the pressure of the oil introduced into the working chamber S overcomes the urging force of the elastic member 39, the piston 37 moves forward (rightward), and the fixed plates 35 and the rotational plates 36 are pressed against to be engaged with each other. On the other hand, when the urging force of the elastic member 39 overcomes the pressure of the oil introduced into the working chamber S, the piston 37 moves rearward (leftward), and the fixed plates 35 and the rotational plates 36 are separated to be disengaged from each other. It is to be noted that the hydraulic brake 60 is connected to an oil pump 70 (refer to FIG. 4).

In the case of this hydraulic brake 60, while the fixed plates 35 are supported by the second cylindrical wall 44 extending from the right-left dividing wall 45 of the central case 11M that constitutes the case 11, the rotational plates 36 are supported by the gear portion 28B of the ring gear 24B. Thus, when pressed against each other by the piston 37, both the plates 35 and 36 are brought into frictional engagement with each other, whereby a braking force acts on to fix the ring gear 24B. When the engagement by the piston 37 is released from that state, the ring gear 24B is permitted to rotate freely. Since the ring gears 24A and 24B are connected to each other as described above, engaging the hydraulic brake 60 makes a braking force act also on to fix the ring gear 24A, whereby disengaging the hydraulic brake 60 permits also the ring gear 24A to rotate freely.

A space portion is also ensured between the connecting portions 30A and 30B of the ring gears 24A and 24B facing each other in the axial direction. The one-way clutch 50 is disposed within the space portion, the one-way clutch 50 being arranged to transmit only power in one direction to the ring gears 24A, 24B and to cut off power in the other direction. The one-way clutch 50 includes a large number of sprags 53 interposed between the inner races 51 and an outer race 52, and the inner races 51 are arranged to integrally rotate with the small diameter portions 29A and 29B of the ring gears 24A and 24 by being spline filled thereto. In addition, the outer race 52 is positioned by the third cylindrical wall 46 and is prevented from rotating.

The one-way clutch 50 is arranged to be engaged with to lock the rotation of the ring gears 24A and 24B when the vehicle 3 travels forward with the power by the first and second motors 2A and 2B. To be more specific, the one-way clutch 50 is brought into the engaged state when the rotational power of the first and second motors 2A and 2B in a forward direction (the rotational direction when the vehicle 3 travels forward) is input into the rear wheels Wr while being brought into the disengaged state when the rotational power of the first and second motors 2A and 2B in the reverse direction is input into the rear wheels Wr. In addition, the one-way clutch 50 is brought into the disengaged state when the rotational power of the rear wheels Wr in the forward direction is input into the first and second motors 2A and 2B while being brought into the engaged state when the rotational power of the rear wheels Wr in the reverse direction is input into the first and second motors 2A and 2B.

Figure 4:
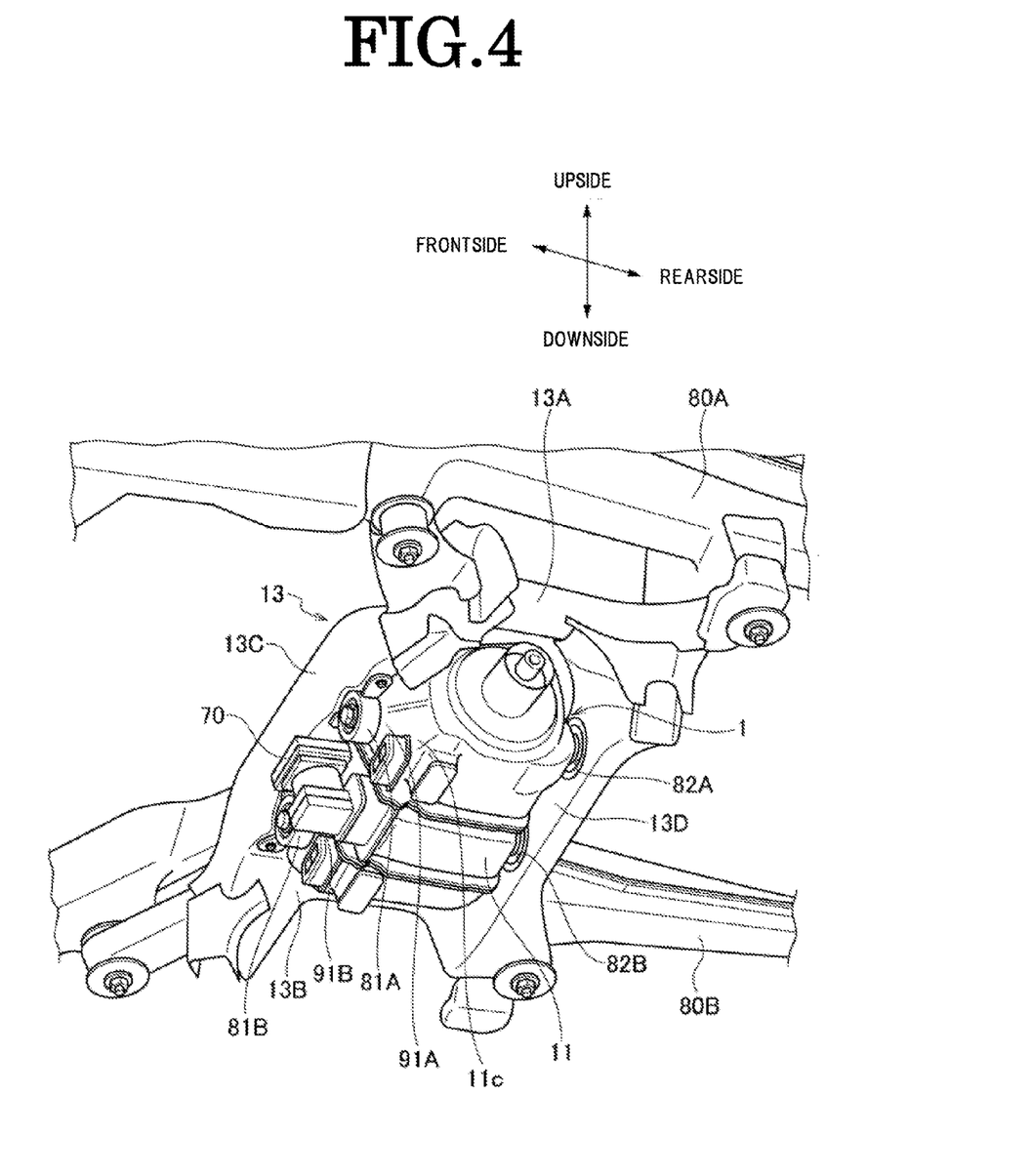
FIG. 4 is a perspective view of the rear wheel driving system supported by supporting members as viewed obliquely from below on the front side.

In addition, as shown in FIG. 4, the oil pump 70 that is one of accessories is fixed to a from surface 11c of the central case 11M. The oil pump 70 is, for example, a trochoidal pump. The oil pump 70 is arranged to suck in oil reserved in right and left reservoirs RL and RR by being driven by a motor (not illustrated) such as a position sensor-less brushless DC motor to lubricate and cool the constituent members via lubrication paths 79A and 79B provided in the mechanism parts such as the case 11 and the axle shafts 10A and 10B.

As described above, in the rear wheel driving system 1 according to the present embodiment, the one-way clutch 50 and the hydraulic brake 60 are disposed in parallel on the power transmission path between the first and second motors 2A and 2B and the rear wheels Wr. The hydraulic brake 60 is controlled to be brought into a disengaged state, a weakly engaged state, or an engaged state by the pressure of oil supplied from the oil pump 70 in accordance with the travelling state of the vehicle or the engaged/disengaged state of the one-way clutch 50. For example, when the vehicle 3 is made to travel forward by the power driving of the first and second motors 2A and 2B (at low vehicle speeds or middle vehicle speeds), the one-way clutch 50 is engaged to be brought into a power transmittable state. However, even when the one-way clutch 50 is brought into the disengaged state because the hydraulic brake 60 is controlled to be brought into the weakly engaged state to temporarily reduce the input of rotational power in the forward direction from the first and second motors 2A are 2B, power transmission between the first and second motors 2A and 2B and the rear wheels Wr can be prevented from becoming unperformable. In addition, when the vehicle 3 is made to travel forward by the power driving of the internal combustion engine 4 and/or the motor 5 (at high vehicle speeds), the one-way clutch 50 is disengaged to control the hydraulic brake 60 to be brought into the disengaged state, whereby the first and second motors 2A and 2B are prevented from overspeeding. On the other hand, when the vehicle 3 is reversed or is decelerated to regenerate energy, the one-way clutch 50 is disengaged, so that by controlling the hydraulic brake 60 to be brought into the engaged state, the rotational power in the reverse direction from the first and second motors 2A and 2B is output to the rear wheels Wr, or the rotational power in the forward direction of the rear wheels Wr is input into the first and second motors 2A and 2B.

Figure 7:
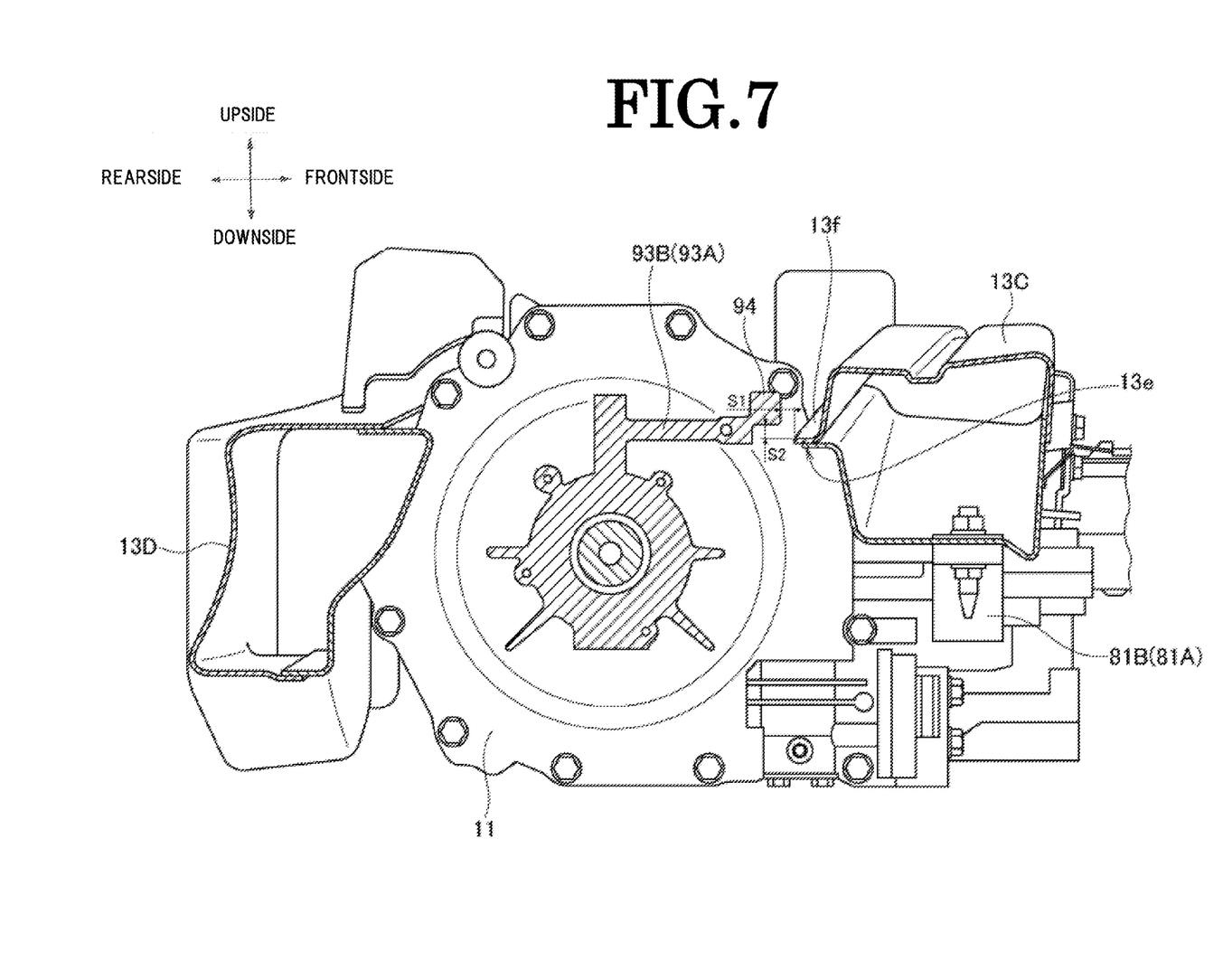
FIG. 7 is a sectional view of the rear wheel driving system supported by the supporting members.

Next, referring to FIGS. 4 and 7, a supporting construction of the rear wheel driving system 1 will be described in detail.

Figure 5:
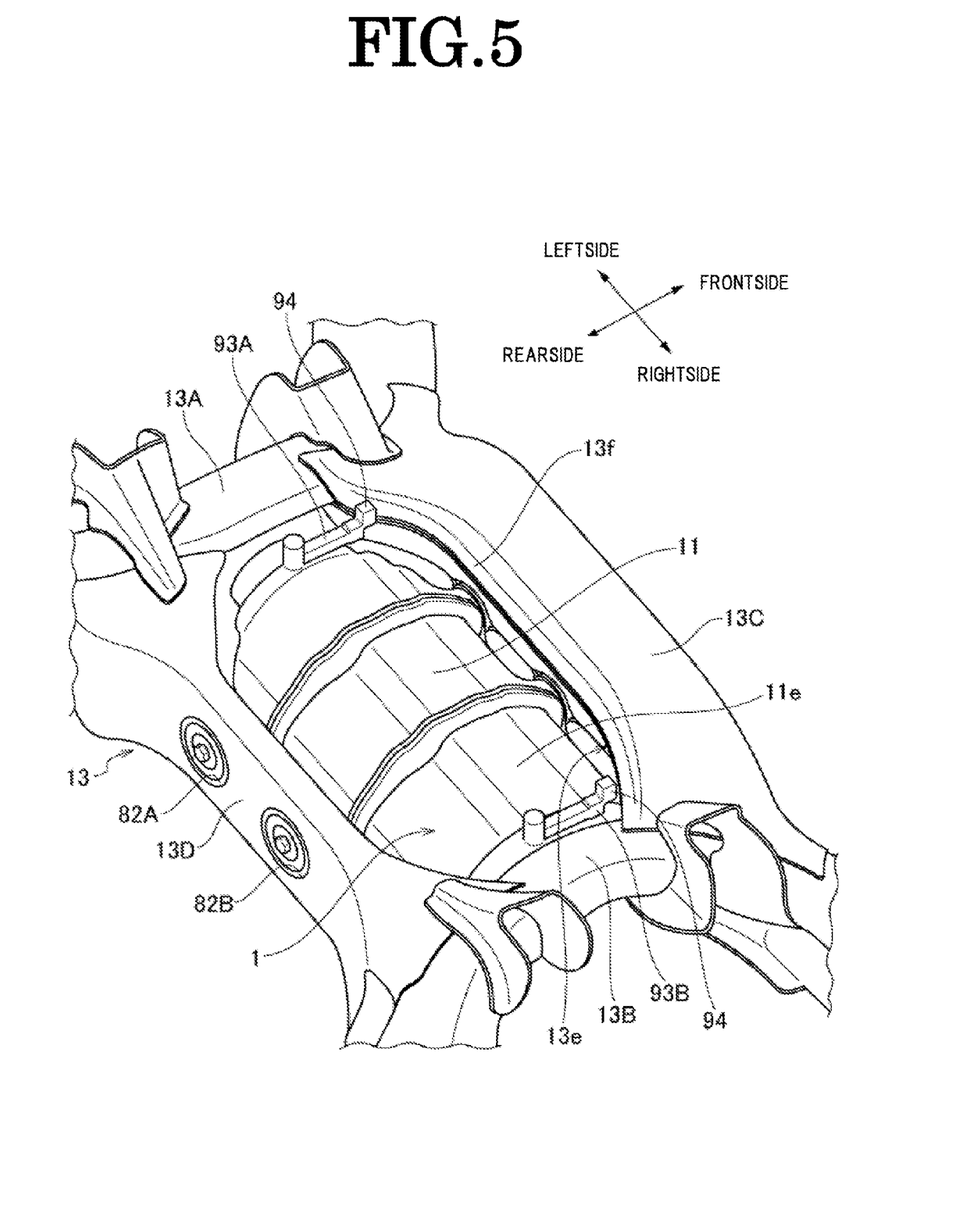
FIG. 5 is a perspective view of the rear wheel driving system supported by the supporting members as viewed obliquely from above on the rear side.
Figure 6:
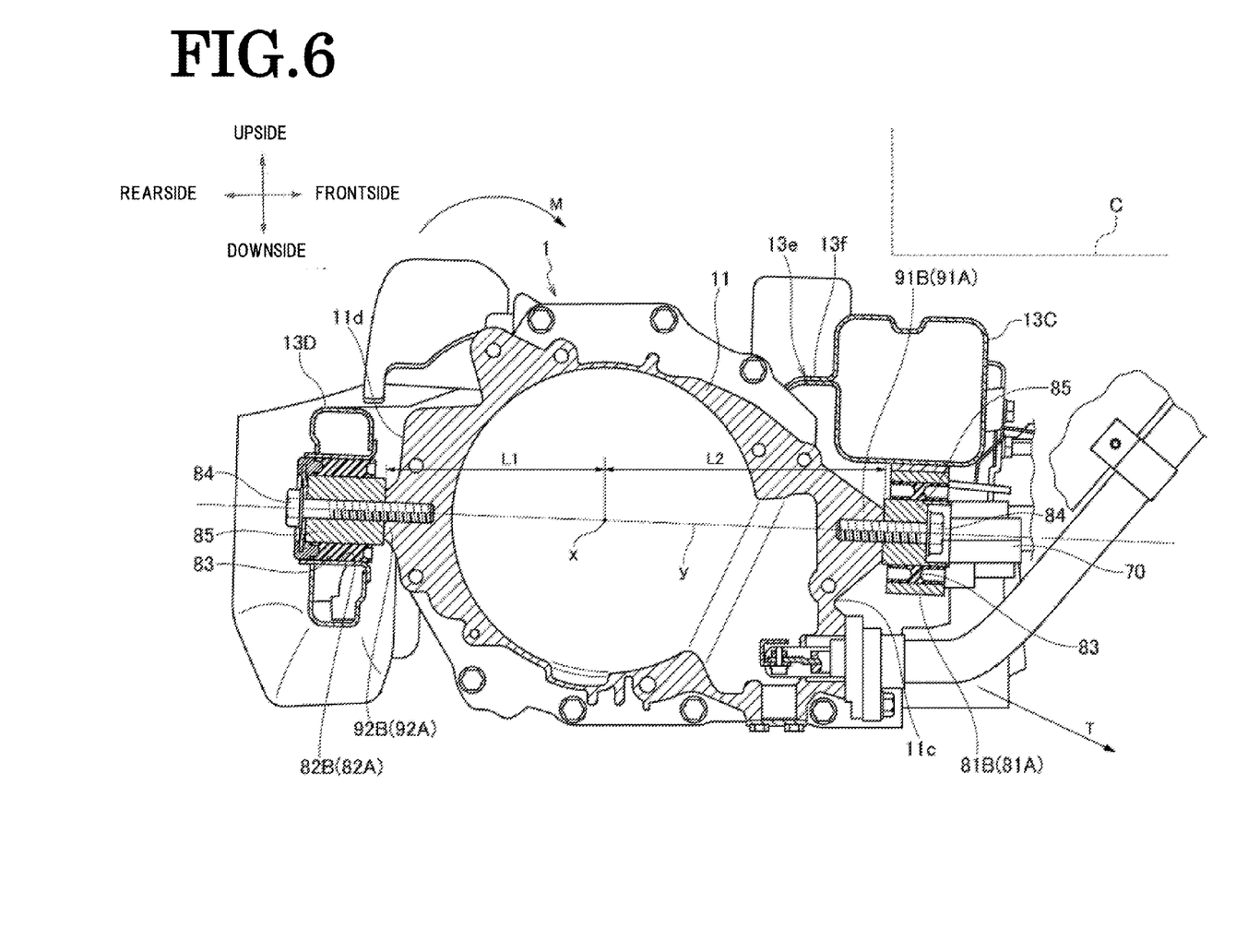
FIG. 6 is a sectional view of the rear wheel driving system supported by the supporting members.

As is obvious from FIG. 1, the rear wheel driving system 1 is disposed offset to the rear side with respect to the center of the vehicle 3 in the front-rear direction, and an occupant space C is disposed in front of and above the rear wheel driving system 1 (refer to FIG. 6). As shown in FIGS. 4 and 5, the rear wheel driving system 1 is supported by the sub-frame 13 supported by a pair of side frames 80A and 80B extending in the front-rear direction. The sub-frame 13 is a frame member having an approximately rectangular shape that is formed of the pair of sub-side frames 13A and 13B extending in the front-rear direction of the vehicle 3, and the front cross frame 13C and the rear cross frame 13D extending in the right-left direction of the vehicle 3 and fixed to the pair of sub-side frames 13A and 13B. The frame member includes a space where the rear wheel driving system 1 is disposed in the center.

As shown in FIG. 6, a pair of brackets 81A and 81B is fixed to the front cross frame 13C with bolts in symmetrical positions with respect to the center of the vehicle 3 in the right-left direction. In addition, supporting portions 82A and 82B penetrate the rear cross frame 13D in positions corresponding to the pair of brackets 81A and 81B in the right-left direction. Mounting members 85 into which bolts 84 are inserted via elastic members 83 are fixed to the brackets 81A and 81B and the supporting portions 82A and 82B of the rear cross frame 13D.

From fixing portions 91A and 91B in which internal threads are formed are provided to the case 11 of the rear wheel driving system 1 supported by the sub-frame 13 while protruding on the from surface 11c so as to correspond to the pair of the brackets 81A and 81B. In addition, rear fixing portions 92A and 92B in which internal threads are formed are provided to the case 11 while protruding on a rear surface 11d so as to correspond to the supporting portions 82A and 82B of the rear cross frame 13D.

As shown in FIG. 5, two extending portions 93A and 93B extending forward in the approximately horizontal direction are provided on a top surface 11e of the case 11 at both the end portions in the right-left direction so as to be disposed in approximately symmetrical positions with respect to the center in the right-left direction of the rear wheel driving system 1. Protruding portions 94 provided to the extending portions 93A and 93B at the distal end portions face the front cross frame 13C via predetermined spaces. A joint flange 13e extends rearward in the approximately horizontal direction from the front cross frame 13C toward the rear wheel driving system 1. The protruding portions 94 are disposed behind in the front-rear direction by a space S1 and above by a space S2 with respect to the top surface 13f of the joint flange 13e as described later.

In addition, among the front fixing portions 91A and 91B and the rear fixing portions 92A and 92B provided to the case 11 of the rear wheel driving system 1, the ones on the side of the vehicle 3 where the rear wheel driving system 1 is disposed, that is, the rear fixing portions 92A and 92B disposed on the rear side are disposed at higher positions in the vertical direction than the front fixing portions 91A and 91B disposed on the from side of the vehicle 3.

The rear wheel driving system 1 is fixed to the sub-frame 13 by disposing the rear wheel driving system 1 inside the sub-frame 13, making the front fixing portions 91A and 91B of the case 11 face the brackets 81A and 81B, making the rear fixing portions 92A and 92B of the case 11 face the supporting portions 82A and 82B of the rear cross frame 13D, and fastening the bolts 84 from the outside of the mounting members 85. At this time, the extending portions 93A and 93B provided to the case 11 have the protruding portions 94 at their distal ends, the protruding portions 94 being separated from the joint flange 13e while being disposed behind in the front-rear direction by the space S1 with respect to the joint flange 13e of the front cross frame 13C and above by the space S2 with respect to the top surface 13f of the joint flange 13e as shown in FIG. 7.

In the rear wheel driving system 1 fixed 10 the sub-frame 13, an imaginary straight line y that passes through the centers of the from fixing portions 91A and 91B (the centers of the bolt holes) and the centers of the rear fixing portions 92A and 92B (the centers of the bolt holes) is inclined from upward to downward and from rearward to forward (to the bottom right in FIG. 6). It is preferable that the imaginary straight line y should be inclined, for example, at an angle of 0.5° to 5° with respect to the horizontal plane.

By disposing the rear wheel driving system 1 disposed on the rear side of the vehicle 3 so as to be inclined in a front down manner from upward to downward and from rearward to forward as described above, a clockwise moment M is produced which raises the rear side of the rear wheel driving system 1 upward and lowers the front side downward as shown in FIG. 6 if an external force of a predetermined value or larger is exerted on the vehicle 3 when the vehicle 3 is involved in a collision from the rear side (hereinafter, referred to as a rear collision) that would have a larger effect on the rear wheel driving system 1. The rear wheel driving system 1 is displaced in the direction indicated by an arrow T in FIG. 6, that is, in a direction away from the occupant space by the external force applied and the moment M produced at the time of the rear collision. At this time, as the rear wheel driving system 1 is displaced, the protruding portions 94 of the extending portions 93A and 93B, which are disposed behind in the front-rear direction by the space S1 and above by the space S2 with respect to the joint flange 13e of the front cross frame 13C, abut on the top surface 13f of the joint flange 13e. Thus, the displacement of the rear wheel driving system 1 is restricted by the joint flange 13e while the rear wheel driving system 1 are supported by the brackets 81A and 81B and the joint flange 13e. Thus, the load from the rear wheel driving system 1 can be shared by the brackets 81A and 81B and the joint flange 13e, which can prevent the brackets 81A and 81B from being broken. Furthermore, the protruding portions 94 of the extending portions 93A and 93B do not abut on the top surface 13f of the joint flange 13e in a normal state, but abut only when the rear wheel driving system 1 is displaced by a predetermined amount or larger, so that vibrations or the like of the rear wheel driving system 1 in a normal state can be prevented from being unnecessarily transmitted to the front cross flame 13C that is on the vehicle side.

In addition, because a distance L1 from a rotating axis x of the first and second motors 2A and 2B to the distal end portions of the rear fixing portions 92A and 92B is shorter than a distance L2 from the rotating axis x to the distal end portions of the front fixing portions 91A and 91B, even though the clockwise moment M is produced when the rear wheel driving system 1 moves, the longer side moves away from the occupant space, which can further prevent the occupant space from being affected adversely.

As described above, according to the present embodiment, the extending portions 93A and 93B extending forward from the rear wheel driving system 1 are arranged to abut on the top surface 13f of the joint flange 13e of the front cross frame 13C when an external force of a predetermined value or larger is exerted from behind on the rear wheel driving system 1 disposed offset to the rear side, and the rear wheel driving system 1 is displaced forward by a predetermined amount or larger. With this configuration, when an external force of a predetermined value or larger is input to the vehicle 3 at the time of rear collision or the like, the rear wheel driving system 1 can be inhibited from being displaced, which can suppress the rear wheel driving system 1 from falling off the sub-frame 13. In addition, since the load from the rear wheel driving system 1 can be shared by the brackets 81A and 81B and the joint flange 13e, the brackets 81A and 81B can be prevented from being broken.

In addition, since the sub-frame 13 includes not only the front cross frame 13C but also the rear cross frame 13D disposed in parallel with the front cross frame 13C and fixed to the pair of sub-side frames 13A and 13B, the impact at the time of rear collision can be reduced. Further, since the sub-frame 13 surrounds the four surfaces of front, rear, right, and left of the rear wheel driving system 1, the rigidity of the periphery of the rear wheel driving system 1 can be improved.

In addition, since the rear fixing portions 92A and 92B of the rear wheel driving system 1 are disposed at higher positions in the vertical direction than the front fixing portions 91A and 91B, the moment M, which raises the rear side of the rear wheel driving system 1 upward and lowers the front side downward, is produced. Thus, the displacement direction of the rear wheel driving system 1 can be made to be a direction away from the occupant space, which can improve the sale performance at the time of collision.

In addition, since the two extending portions 93A and 93B are provided on the right side and the left side with respect to the center of the rear wheel driving system 1 in the right-left direction, the extending portions 93A and 93B make the rear wheel driving system 1 less likely to lose its posture after abutting on the top surface 13f of the joint flange 13e. Furthermore the number of the extending portions 93A and 93B is not limited to two, and one extending portion may be provided, or three or more extending portions may be provided. Since the extending portions 93A and 93B are disposed at approximately mirror-symmetrical positions, the extending portions 93A and 93B make the rear wheel driving system 1 much less likely to lose its posture after abutting.

In addition, since the extending portions 93A and 93B extend in the approximately horizontal direction, the rear wheel driving system 1 is made to less likely to fall off after abutting. Further, since the extending portions 93A and 93B include the protruding portions 94 that further extend from their distal ends, the extending portions 93A and 93B can be easily caught by the front cross frame 13C, preventing the rear wheel driving system 1 from falling off. Furthermore the extending portions 93A and 93B may not extend in the approximately horizontal direction. The extending portions 93A and 93B may only be inclined to the vertical direction, and the protruding portions 94 may not be provided.

Figure 8:
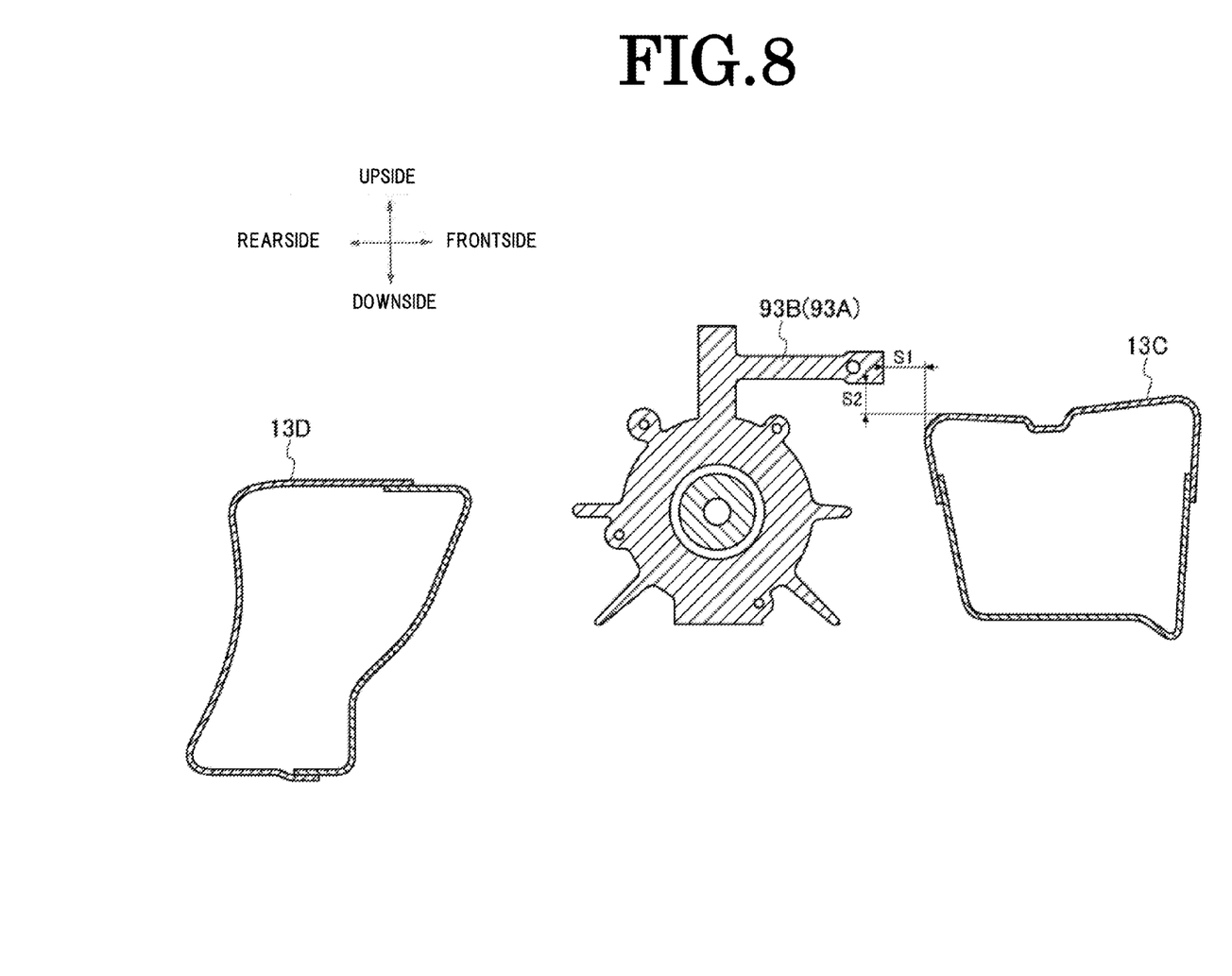
FIG. 8 is a simplified sectional view of the rear wheel driving system supported by supporting members according to a modification showing the end portion on the lateral side.

In addition, since the joint flange 13e extending from the front cross frame 13C toward the rear wheel driving system 1 is provided, the extending portions 93A and 93B of the rear wheel driving system 1 are made to easily abut on the front cross frame 13C. Furthermore the front cross frame 13C may not include the joint flange 13e necessarily, and the extending portions 93A and 93B may be disposed so as to abut on the top surface of the front cross frame 13C that faces upward in the vertical direction at the time of rear collision as shown in FIG. 8. In this case, in the state where an external force of a predetermined value or larger is not exerted, the extending portions 93A and 93B of the rear wheel driving system 1 are separated from the front cross frame 13C while being disposed behind in the front-rear direction by the space S1 with respect to the front cross frame 13C and above by the space S2 with respect to the top surface 13f of the front cross frame 13C. Shown in the example in FIG. 8 is a case where the extending portions 93A and 93B include no protruding portions 94.

Furthermore the supporting construction of the rear wheel driving system 1 described above may be applied not only to the rear wheel driving system 1 but also to the front wheel driving system 6. In this case, the extending portions 93A and 93B extending rearward are provided to the top surface 11e, and the protruding portions 94 provided to the extending portions 93A and 93B at the distal end portions are disposed facing the rear cross frame 13D via predetermined spaces.

Figure 9:
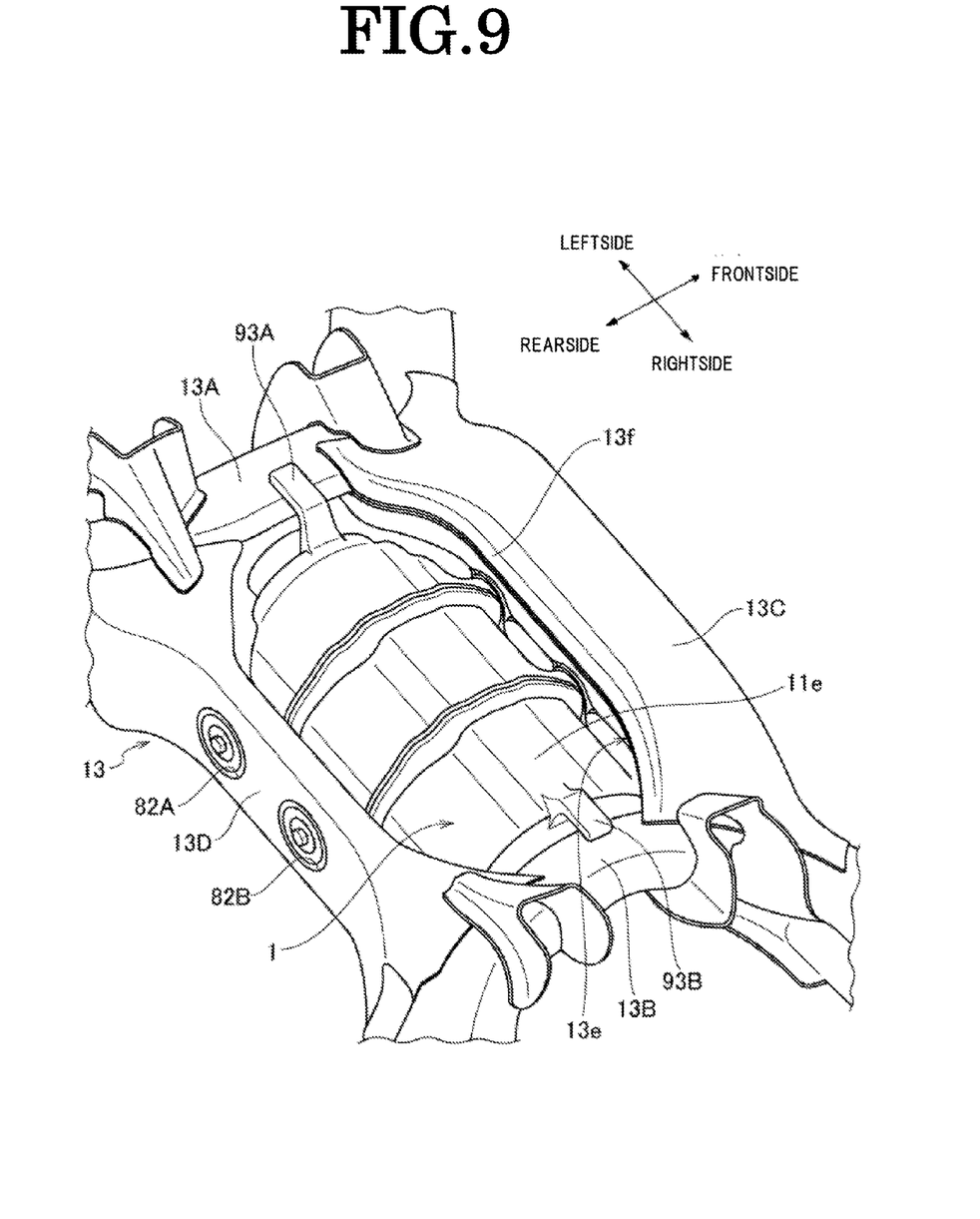
FIG. 9 is a perspective view of the rear wheel driving system supported by supporting members according to another modification as viewed obliquely from above on the rear side.

In addition, while described as an example in the above-described embodiment are the extending portions 93A and 93B extending forward in the approximately horizontal direction on the top surface 11e of the case 11 at both the end portions in the right-left direction, the two extending portions 93A and 93B may extend in directions opposite to each other in the right-left direction. To be specific, as shown in FIG. 9, the extending portion 93B disposed at the left end portion of the case 11 is disposed above the sub-side frame 13B by a predetermined space by being disposed so as to extend upward to be then bent leftward while the extending portion 93A disposed at the right end portion of the case 11 is disposed above the sub-side frame 13A by a predetermined space by being disposed so as to extend upward to be then bent rightward.

Since the extending portions 93A and 93B are provided as described above, when the rear wheel driving system 1 is displaced in the direction indicated by the arrow T in FIG. 6, that is, in the direction away from the occupant space, by an external force applied and the moment M produced at the time of the rear collision, the extending portions 93A and 93B, which are disposed above the sub-side frames 13A and 13B by a predetermined space, abut on the top surfaces of the sub-side frames 13A and 13B as the rear wheel driving system 1 is displaced downward in the vertical direction. Thus, the displacement of the rear wheel driving system 1 downward in the vertical direction is restricted by the sub-side frames 13A and 13B while supported by the brackets 81A and 81B and the sub-side frames 13A and 13B. Thus, the load from the rear wheel driving system 1 can be shared by the brackets 81A and 81B and the sub-side frames 13A and 13B, which can prevent the brackets 81A and 81B from being broken.

Furthermore in this case, the rear wheel driving system 1 can be made to reliably abut on the sub-side frames 13A and 13B irrespective of the amount of displacement of the rear wheel driving system 1 in the front-rear direction. In addition, since the sub-side frames 13A and 13B are disposed on the right side and the left side, the sub-side frames 13A and 13B make the rear wheel driving system 1 less likely to lose its posture after abutting.

The invention is not limited to the embodiments that have been described above and hence can be modified or improved as required.

For example, in the present embodiments, while a hybrid vehicle is described as a vehicle to which the present invention is applied, the present invention is not limited to these aspects. For example, the invention may be applied to an electric vehicle that uses only a motor as a drive source.

In addition, in the above-described aspects, while the rear wheel driving system 1 including the first and second motors 1A and 2A and the first and second planetary gear type speed reducers 12A and 12B is described as an example of a mounted object, one, or two or more motors or speed changers may be included, and the mounted object is not limited specifically only if it can be mounted on the vehicle This patent application is based on Japanese Patent Application (No. 2013-249617) filed on Dec. 2, 2013, the contents of which are incorporated herein by reference.

DESCRIPTION OF REFERENCE NUMERALS AND CHARACTERS

1 Rear wheel driving system (mounted object)
2A First motor (motor)
2B Second motor (motor)
3 Vehicle
13 Sub-frame (framework member)
13e joint flange
13A and 13B Sub-side frames (front-rear framework members)
13C Front cross frame (right-left framework member)
13D Rear cross frame (another right-left framework member)
13f Top surface
81A and 81B Brackets (second supporting member)
82A and 82B Supporting portions (first supporting member)
91A and 91B Front fixing portions (second fixing portion)
92A and 92B Rear fixing portions (first fixing portion)
93A and 93B Extending portions
94 Protruding portions
Wr Rear wheels (wheels)

The invention claimed is:

1. A vehicle comprising a mounted object, which is supported by a framework member of the vehicle with a supporting member and which is disposed offset to one side of the vehicle with respect to a center of the vehicle in a front-rear direction, wherein
the framework member includes a pair of front-rear framework members that extends in the front-rear direction of the vehicle, and a right-left framework member that extends in a right-left direction of the vehicle and that is fixed to the pair of front-rear framework members;
the supporting member is fixed to the right-left framework;
the mounted object is disposed on the one side with respect to the right-left framework member; and
the mounted object comprises an extending portion that extends from the mounted object while inclined to a vertical direction or that extends from the mounted object in a horizontal direction, and
that is formed such that, when an external force of a predetermined value or larger is exerted on the mounted object from the one side to displace the mounted object to another side by a predetermined amount or larger, the extending portion abuts on a surface of the right-left framework member, the surface facing upward in the vertical direction,
the vehicle, further comprising another right-left framework member that is disposed in parallel with the right-left framework member to sandwich the mounted object therebetween, and that is fixed to the pair of front-rear framework members.

2. The vehicle according to claim 1, wherein
the extending portion is formed such that, when the external force of the predetermined value or larger is exerted on the mounted object from the one side to displace the mounted object to the another side by the predetermined amount or larger, the extending portion abuts on a surface of the right-left framework member in a state where the mounted object is supported by the supporting member, the surface facing upward in the vertical direction.

3. The vehicle according to claim 1, wherein:
the supporting member includes a first supporting member and a second supporting member;
the mounted object includes fixing portions that are fixed to the first supporting member and the second supporting member; and
a first fixing portion of the fixing portions, the first fixing portion being disposed relatively closer to the one side, is disposed at a higher position in the vertical direction than a second fixing portion of the fixing portions, the second fixing portion being disposed closer to the another side.

4. The vehicle according to claim 1, wherein
the right-left framework member comprises a portion configured to extend from the right-left framework member toward the mounted object.

5. The vehicle according to claim 1, wherein
the supporting member is fixed to a lower side of the right-left framework member.

6. The vehicle according to claim 1, wherein
the extending portion extends in an approximately horizontal direction.

7. The vehicle according to claim 1, wherein
the extending portion includes a protruding portion that extends further from a distal end of the extending portion.

8. The vehicle according to claim 1, wherein
the mounted object is a motor that drives a wheel of the vehicle.

9. The vehicle according to claim 1, wherein
the extending portion includes two extending portions that are disposed on a right side and a left side with respect to a center of the mounted object in the right-left direction.

10. The vehicle according to claim 9, wherein
the two extending portions are disposed in approximately symmetrical positions with respect to the center in the right-left direction.

* * * * *